United States Patent [19]

Hedrick et al.

[11] 4,385,993
[45] May 31, 1983

[54] METHOD AND APPARATUS FOR FOLDED MOVING BED ION EXCHANGE SYSTEM

[75] Inventors: Harold N. Hedrick, Brandon; Solon G. Whitney, Bartow, both of Fla.

[73] Assignee: American Petro Mart, Inc., Bartow, Fla.

[21] Appl. No.: 275,658

[22] Filed: Jun. 22, 1981

[51] Int. Cl.³ .............................................. B01D 15/04
[52] U.S. Cl. .................................... 210/675; 210/189; 210/274
[58] Field of Search ............... 210/670, 673, 675, 676, 210/189–191, 269, 274

[56] References Cited

U.S. PATENT DOCUMENTS

| | | | |
|---|---|---|---|
| 2,815,322 | 12/1957 | Higgins | 210/676 |
| 3,492,092 | 1/1970 | Higgins | 210/676 |
| 3,579,322 | 5/1971 | Higgins | 210/685 |
| 3,775,088 | 11/1973 | Higgins | 423/396 |
| 3,993,562 | 11/1976 | Kashiwabara et al. | 210/189 |
| 4,228,001 | 10/1980 | Carlson | 210/676 |
| 4,280,904 | 7/1981 | Carlson | 210/676 |

OTHER PUBLICATIONS

Higgins, et al., Chem. Engr. Prog. Symposium, Ser. 50, No. 14, 87–92 (1954).
Higgins, Indust. and Engr. Chem., vol. 53, 635–637 (1961).

Primary Examiner—Ivars C. Cintins

[57] ABSTRACT

Apparatus and operating method improvements are provided for an ion exchange apparatus system utilizing moving folded beds for loading and regeneration of the resin. The improvements include separate treatment and pulse chambers in the resin circuit from the loading column to the regeneration column, and in the return circuit from the regeneration column to the loading column. With the improved apparatus and method, the resin is transferred in compacted metered increments from and into the loading and regeneration columns.

11 Claims, 1 Drawing Figure

METHOD AND APPARATUS FOR FOLDED MOVING BED ION EXCHANGE SYSTEM

BACKGROUND AND PRIOR ART

The field of this invention relates to ion exchange apparatus systems utilizing moving folded beds for loading and stripping of the resin. More particularly, this invention relates to improvements in the folded moving bed ion exchange system described in U.S. Pat. No. 4,228,001, and/or in the system disclosed in U.S. Pat. No. 4,280,904. It is believed that the systems described in these references constitute the most pertinent prior art with respect to the subject matter described in this application.

Various arrangements for folded moving bed ion exchange systems have heretofore been proposed such as those shown in U.S. Pat. Nos. 2,815,322, 3,492,092, 3,579,322, and 3,775,088. However such systems are believed to have been used commercially only for limited and specialized purposes, principally for the ion exchange treatment of boiler water. See Higgins, et al., Chem. Eng. Prog. Symposium, Ser. 50, No. 14, 87-92 (1954); and Higgins, Indust. and Engr. Chem., Vol. 53, 635-37 (1961). The assignee of the present application, American Petro-Mart, Inc., of Bartow, Florida, has been conducting an intensive pilot plant investigation of a folded moving bed ion exchange system for removal of magnesium and calcium from phosphate rockderived phosphoric acid, and for other purposes, including uranium recovery. The above-cited U.S. Pat. No. 4,228,001 and U.S. Pat. No. 4,280,904 are based on this research. This application is directed to apparatus and method improvements developed since the filing of the cited prior patents.

Since moving folded bed ion exchange systems provide a continuous resin transfer circuit between the resin loading column and the stripping or regeneration column, there is a problem in maintaining separation of the feed and product solutions of the loading column from the regenerating solutions of the regeneration column. For example, when the system is being operated for the removal of magnesium and calcium from phosphoric acid, sulfuric acid can be used advantageously as the regenerating solution, but after regeneration the resin may be returned to the loading column with residual sulfuric acid, thereby contaminating the phosphoric acid solution in the loading column and resulting in a loss of sulfuric acid. This problem is accentuated by the fact that the return of regenerated resin is to the bottom of the loading column which is the point of withdrawal of the treated feed so that any residual acid from the regenerating column tends to mix with and contaminate the product of the loading column such as the phosphoric acid from which the magnesium and calcium has been removed.

Similarily, where loaded resin is removed from the loading column for regeneration together with the solution of the loading column, such as the incoming raw phosphoric acid, a substantial loss of the feed can occur. For example, with the system of U.S. Pat. No. 4,228,001, raw feed under pump pressure is used as the transport medium for the loaded resin, the resin being removed at the top of the loading column adjacent the point of entry of the feed. Although the phosphoric acid transferred with the resin can be at least partially recovered and recycled, it is very desirable to minimize the transfer of feed liquid with the loaded resin. Also, for the reasons already indicated, it is desirable to further reduce the transfer of regenerating solution with the regenerated resin returned to the loading column.

SUMMARY OF INVENTION

To overcome the problems described and to achieve the desired objectives, the improved system of the present invention utilizes the concept of separate treatment and pulse chambers in the circuits between the loading and regeneration columns. With this arrangement, in the treatment chambers the resin can be processed to remove the solution with which it has been in contact, such as the feed solution or the regenerating solution, by a combination of steps, including, for example, water washing and air blowing. The semi-dry resin can then be fluidized with the next liquid with which it is to be in contact, such as spent regenerating acid or product passed to the regeneration or loading pulse chambers after opening of the resin transfer valves which isolated the treatment chambers during treatment of the resin. As part of the transfer of the refluidized resin, residual air from the air blowing can be expelled from the resin. In the separate pulse chambers, the resin can be compacted such as by downward liquid circulation through the resin beds, and subsequently transferred to the loading or regeneration columns as compacted resin increments by air or liquid pressure from above the resin bed. Essentially, plug flow of the resin increments is thereby achieved.

With previous moving folded bed ion exchange systems, the resin has been transferred as a loose slurry using a liquid carrier under pump pressure. The improved apparatus and method of the present invention utilizes a much more compact form of slurry for the resin transfers, the transferred resin preferably being in the form of fully compacted increments containing a minimized volume of liquid. The increments of resin are pushed or pulsed by air or liquid pressure from above. Further, with this arrangement, the loading and regeneration columns are maintained substantially completely full of resin, that is, the resin extends continuously in compacted form from the bottom to the top of the columns. When an increment of resin is pulsed into the bottom of a column, it causes an increment of corresponding volume to be pushed out of the top of the columns.

The improved system described, greatly facilitates automated or computer controlled operation. Precisely metered increments of the resin can be introduced into and removed from the loading and stripping columns, and the volume of the increments can be selected to achieve a desired steady state operation. Further objectives and advantages will be indicated in the following detailed specification.

THE DRAWING

The apparatus and method improvements of this invention are illustrated by the diagrammatic flow sheet attached hereto as FIG. 1. It will be understood that this represents a presently preferred embodiment, and that the apparatus and method improvements hereof are not limited in their application to the specific system shown in the drawing.

DESCRIPTION OF PREFERRED EMBODIMENTS

Figure 1:
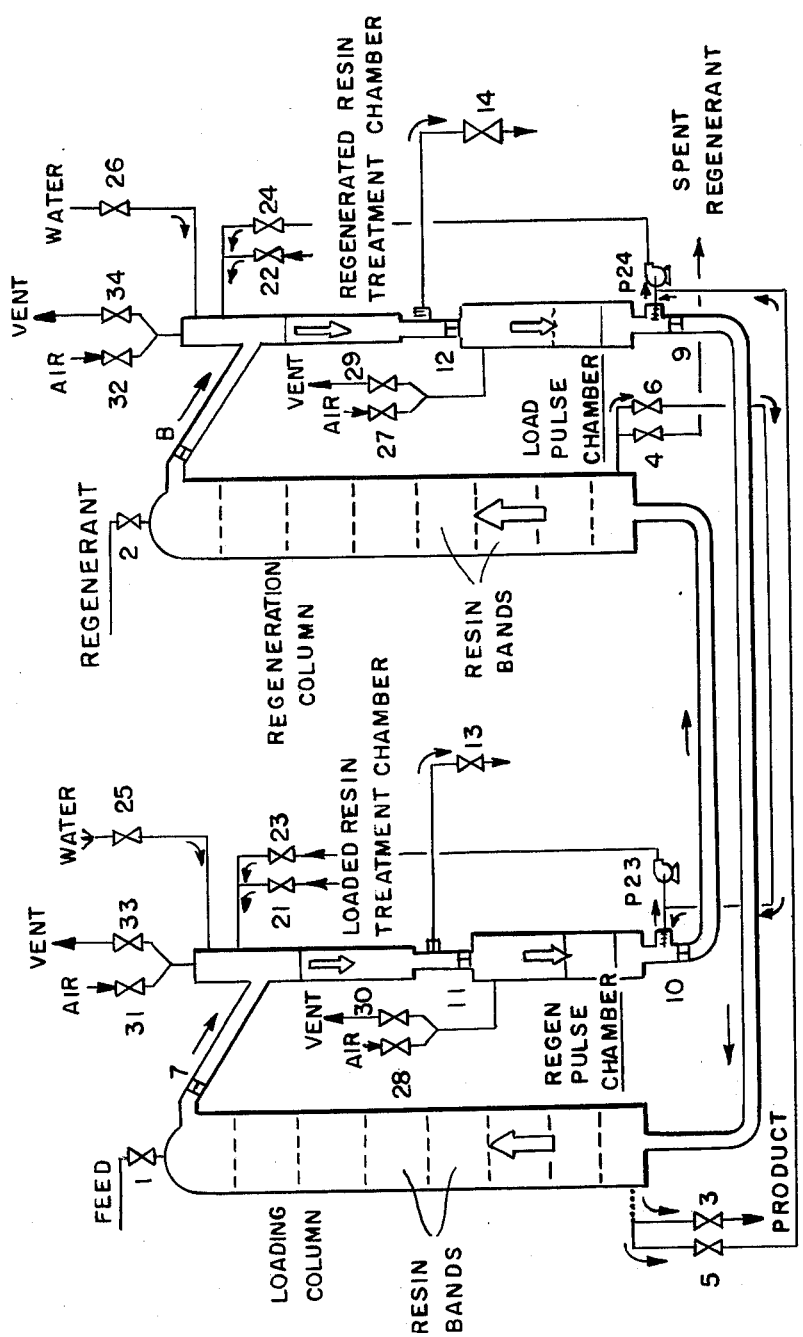

As illustrated by FIG. 1, the apparatus system includes a resin-containing loading column and a resin-containing regeneration column, resin transfer means for moving increments of liquid-containing loaded resin in a circuit from the upper portion of the loading column to the lower portion of the regeneration column, and another resin transfer means for moving increments of liquid-containing regenerated resin from the upper portion of the regeneration column to the lower portion of the loading column. In the illustration given, and preferably, the resin transfer circuit between the loading column and the regeneration column includes a loaded resin treatment chamber separated from the loading column by a resin valve 7, and a regeneration pulse chamber separated from the loaded resin treatment chamber by a resin valve 11. A further resin valve 10 is provided in the conduit between the regeneration pulse chamber and the bottom of the regeneration column. Similarily, there is preferably provided in the resin transfer circuit from the regeneration column to the loading column a regenerated resin treatment chamber separated from the regeneration column by a resin valve 8. The regenerated resin treatment chamber in turn is separated from the loading pulse chamber by the resin valve 12, and the loading pulse chamber is separated from the loading column by the resin valve 9. The complete circuit of the resin as indicated by the arrows applied to the path of resin flow through the units just described and their connecting resin conduits.

Looking first at the portion of the circuit providing the loaded resin treatment chamber and regeneration pulse chamber, it can be seen that these units respectively can provide separate resin treatment. In the embodiment shown, the loaded resin treatment chamber receives resin and liquid from the loading column through resin valve 7 and the connecting conduit. After treatment, the regeneration pulse chamber receives the treated resin from the loaded resin treatment chamber when connected thereto through resin valve 11.

The loaded resin treatment chamber includes gas and liquid inlet and oulet means for use in removing from the resin the liquid transferred therewith from the loading column. In the illustration given, the top of the treatment chamber is respectively connected to the air vent through valve 33, to a source of compressed air through valve 31, to a source of wash water through valve 25, and, optionally, to a source of loaded resin treatment fluids which may constitute a first stage regeneration, through valve 21. Liquid or gas forced through the resin in the loaded resin treatment chamber can be removed to waste or storage through valve 13. Liquid can also be introduced into the top of the loaded resin treatment chamber through valve 23 as will subsequently be described in greater detail.

The regeneration pulse chamber is provided with fluid (gas or liquid) inlet means for generating pressure therein to transfer pulsed increments of treated resin from the bottom of the regeneration pulse chamber to the regeneration column through valve 10. For example, in the illustration given, with valve 11 closed, compressed air can be introduced through valve 28 into the freeboard space above the liquid and resin in the regeneration pulse chamber, thereby generating the required driving force for moving an increment of resin. Liquid pressure can also be used by filling the pulse chamber with liquid above the compacted resin and generating pump pressure therein. When valves 1 and 8 are open, loaded resin will move into the bottom of the regeneration column, and a corresponding volume of regenerated resin will move from the top of the regeneration column into the regenerated resin treatment chamber, until a level sensor within the regenerated resin treatment chamber indicates that the desired increment has been moved, at which time valves 10 and 8 are closed, and the regeneration pulse chamber pressure is vented.

The bottom of the regeneration pulse chamber is provided with a liquid inlet/outlet equipped with resin-retaining strainer means, which inlet/outlet serves two functions. After pulse, spent regenerant solution from valve 6 is brought into the regeneration pulse chamber through this inlet/outlet, until a pre-set level is reached, to replenish the volume of liquid moved into the regeneration column during pulse. This is the liquid into which semi-dry resin will be dropped and washed during the later transfer step. In addition, this inlet/outlet provides a means of supplying resin-free liquid to the top of the loaded resin treatment chamber during said transfer step, in which step valve 11 and valve 23 are open, and pump P23 is pumping. The resulting liquid flow washes the resin from the treatment chamber into the pulse chamber, removes entrained air (by allowing resin to fall into standing liquid), and helps to compact the resin in the bottom of the pulse chamber.

Preferably a similar apparatus arrangement to that just described is provided between the stripping column and the loading column. As shown in FIG. 1, this can include a regenerated resin chamber and a loading pulse chamber, which chambers can be selectively isolated or connected by the closing or opening of resin valve 12. The top of the loading treatment chamber communicates with a gas vent through valve 34, with a source of compressed air through valve 32, with a source of wash water through valve 26, and, optionally, with a regeneration treatment fluid through valve 22, which may constitute a third stage regeneration or a conditioning treatment. Liquid may also be introduced into the top of the regeneration treatment chamber through valve 24.

As indicated diagrammatically in FIG. 1, the loading and stripping columns are full of the ion exchange resin beads from the bottom to the top thereof. Within the column the resin beads are maintained in a substantially fully compacted condition, that is, the beads are continuously in contact with the adjacent beads. With this arrangement, as will subsequently be described in greater detail, the introduction of a pulsed increment of resin beads to the bottom of the loading or stripping column causes the expulsion of a resin increment of corresponding volume for the top thereof, the pulsed-expelled increment being transferred to one of the treatment chambers, as previously described. The resin increments thereby move with essentially plug-type flow.

It will be understood that the system of this invention is not limited to any specific kind of ion exchange resin. Depending on the process being conducted any one of a variety of cation or anion exchange resins can be used. Other process or design modifications will readily occur to those skilled in the art. For example, it will be apparent that the loaded resin treatment chamber, and/or the regenerated resin treatment chamber may be subdivided, such as a sequence of two treatment chambers before the pulse chambers.

GENERAL OPERATION

As previously described, pursuant to the improved apparatus and operational method of the present invention, the loading and stripping columns are maintained full of the resin beads. The resin is transferred by pulsing packed increments of the beads into the bottom of the columns, and simultaneously removing resin increments from the tops of the columns. The removed resin increments from a given column will have a packed volume corresponding to that of the packed increment introduced into the bottom of the same column. For example, with reference to the loading column of FIG. 1, the liquid feed for ion removal may be introduced into the top of the column through valve 1, passed downwardly through the continuous bed of resin in the column, and the product removed from the bottom of the column through valve 3. Preferably, during the flow of feed, the resin bed within the loading column is maintained in static condition. Valves 1 and 3 are closed as an increment of regenerated resin is introduced into the bottom of the column by means which will be subsequently described. The introduced increments do not mix appreciably, but move upwardly in the column forming in effect a series of bands as indicated by the dotted lines extending across the column. With the introduction of each new increment or band into the bottom of the column, an increment of corresponding volume is discharged from the top of the column. During the introduction and removal of the resin increments, resin valves 7 and 9 will be open. As soon as these valves are closed, the introduction and removal of the feed may be resumed. For example, phosphoric acid containing magnesium and calcium may be passed through a bed of cation exchange resin in the hydrogen form for removal of the calcium and magnesium. The bands of resin will become progressively more loaded with the removed ions as the bands move upwardly in the column. For example, the lower most band adjacent the point of product removal may be substantially free of the ions being adsorbed, while the upper most band adjacent the resin outlet from the top of the column will be the most fully loaded.

The movement of resin through the regeneration column is similar. An increment of the resin for regeneration is pulsed into the bottom of the column with the simultaneous removal of an increment of corresponding volume from the top of the column, resin valves 8 and 10 being open. During this transfer, the regenerating acid may continue to be passed through the resin within the regeneration column by having valves 2 and 4 open, or the regenerating flow may be closed during the resin introduction and removal by having these valves closed.

The increments of resin beads ejected from the tops of the loading and regeneration columns will pass through the connecting conduits respectively to the loaded resin treatment chamber and the regenerated resin treatment chamber, valves 7 and 8 being open, and will cause a corresponding volume of resin to fall downwardly into the loaded resin treatment chamber or regenerated treatment chamber. During this transfer, resin valves 11 and 12 will be closed so that the transferred resin and the liquid contained therein will be retained above these valves within the respective receiver. On the completion of the increment transfers, valve 7 or 8 will be closed. In FIG. 1, the position of the resin in the transfer conduits above the receivers and the level of the resin beds within the receivers are indicated by the labelled dotted lines. Usually, the treatment chambers will be filled with resin, only to the level of the incremental pulse volume desired, leaving a freeboard or working space thereabove.

In the treatment chambers, the transferred resin increments are treated for removal of the liquid transferred therewith, such as the feed (phosphoric acid) transferred with the resin to the loaded resin treatment chamber, or the regenerant (sulfuric acid) transferred with the resin to the regenerated resin treatment chamber. For example, a series of air purges and water washes can be used. In one procedure, the free liquid (not absorbed within the beads) is forced out of the transferred increments by introducing compressed air respectively through the inlet valves 31 or 32 and removing the liquid and blowout air respectively through the outlet valves 13 or 14 . The air valves may then be closed and wash water introduced through the inlet valves 25 or 26 flowing downwardly through the resin in the receivers and exiting together with the washed out acid through outlet valves 13 or 14. If required, the air purges and water washes can be repeated until the resin beads are substantially free of the transferred liquid. As a final step, it will usually be preferred to use an air blowdown so that the resin increment is left in a semi-dry condition, being substantially free of wash water as well as the transferred liquid.

The resin increments left in semi-dry condition within the treatment chambers must be transferred respectively to the regeneration or loading pulse chambers. The liquid used for this transfer is preferably a liquid which is compatible with the liquid in the column to which the resin will be pulsed. For example, the movement from the loaded resin treatment chamber may be accomplished with spent regenerant similar to the regenerant removed through valve 4 or 6 at the bottom of the stripping column, or the resin within the regenerated resin treatment chamber may be removed with a flow of product, such as the product removed through valve 3 or 5 from the loading column. These liquids enter the pulse chambers respectively through the inlet/outlet strainer at the bottom, and fill these chambers to a pre-set level such that there is sufficient freeboard space for the addition of semi-dry resin from the respective treatment chamber above.

Pumps P23 and P24 respectively pump liquid from the regeneration pulse chamber to the loaded resin treatment chamber, through valve 23, and from the loading pulse chamber to the regenerated resin treatment chamber through valve 24. With valves 11 or 12 open, transfer may be accomplished by this said flow forcing liquid into and through the semi-dry resin, partially fluidizing it, and allowing it to drop, in fluid state, into the remaining standing liquid in the pulse chamber below. Resin remaining on the walls is washed by continuation of this flow, and the downward movement of liquid resulting from this re-cycle pumping arrangement tends to compact the resin at the bottom of the pulse chambers, facilitating incremental pulse.

To effect the transfer from the pulse chambers, liquid or gas (such as compressed air) is introduced into the upper portion of the transfer vessels in the freeboard space above the liquid levels therein. In the illustration given, this can be accomplished by supplying the compressed air respectively through valves 27 or 28 to the pulse chambers. Air pressures in the range of 30 to 60 psi can be used to move the resin increments.

The resin valves 7, 9, 8 and 10 are opened, allowing an increment of the resin beads to be respectively transferred to the bottom of the regeneration column or to the bottom of the loading column. At the same time, as previously described, a resin increment of corresponding volume is discharged from the top of the columns, the volume discharged being monitored by level sensors in the treatment chambers, which control the closing of valves 7, 9, 8 and 10, respectively.

In certain process systems, it may be desirable to partially regenerate the resin in the loaded resin treatment chamber. This can be done by introducing a regenerant solution through valve 21, which will pass through the resin within the stripping treatment chamber and out through valve 13. For example, as indicated in FIG. 1, sulfuric acid solution saturated with calcium sulfate can be employed as a partial stripping solution. Where the resin contains both absorbed magnesium and calcium and the stripping solution is saturated with calcium but below magnesium saturation, the calcium can be selectively removed from the resin. This system of operation is described more completely in the co-pending application, filed on even date herewith, entitled "Method of Selectively Removing Absorbed Calcium and Magnesium from Cation Exchange Resins", Ser. No. 275,648.

Similarly, the regenerated resin treatment chamber may be used in some applicants to further treat the resin by means other than water or air. For example, it may be necessary to further polish the resin with another regenerant solution, or to exchange the regenerant ions sorbed on to the resin, such as exchange of sodium for hydrogen in cation resins, or such as sulfate or nitrate for chloride in anion systems. This may be accomplished by supplying the required solution through valve 22 into the regenerated resin treatment chamber, and collection the effluent at valve 14, after it has passed through the resin.

Where it is desired to employ aqueous sulfuric acid of relatively high concentration, such as 50 weight percent sulfuric acid, for regeneration of the resin, and to obtain a by-product sulfuric acid of high concentration, such as 75% sulfuric acid, a procedure may be employed which is described in the co-pending application, filed on even date herewith, entitled "Method of Using Concentrated Sulfuric Acid for Stripping and Precipitation of Adsorbed Calcium and Magnesium", Ser. No. 275,651, abandoned in favor of continuation-in-part application Ser. No. 386,768, filed June 10, 1982.

DETAILED EXAMPLE

This operating example assumes that the processing units, valves, pumps and related equipment of FIG. 1 are fully automated and provided with meters and sensors to adapt the system for microprocessor control. Because of the desired short time sequences for each of the described steps, manual control would be impractical. In this example, all valves are normally closed, and are all closed at the end of each step. Therefore, only those valves noted during a step are open.

TASK 1 STEPS

Treatment chambers are empty. Pulse chambers contain resin. Pulse chambers are pressurized through valves 27 and 28, such as to 40 to 50 psig. Treatment chambers are vented through valves 33 and 34. Resin valves 8 and 10 are opened, and loaded resin is forced out of the regeneration pulse chamber through valve 10 into the bottom of the regeneration column; resin within this column is displaced upwards, expelling regenerated resin and entrained regenerant from the top of the regeneration column into the regenerated resin treatement chamber. When this chamber contains the desired volume of resin, level sensors cause the resin valves 8 and 10 to close, stopping pulse in the regeneration system. Simultaneously with the opening of valves 8 and 10, valves 7 and 9 are opened, allowing regenerated resin to be forced from the load pulse chamber through valve 9 into the bottom of the loading column; resin in this column rises, forcing loaded resin and entrained feed liquid through valve 7 into the loaded resin treatment chamber. Level sensors monitor the volume of resin in the loaded resin treatment chamber, causing the closing of valves 7 and 9 when the desired volume has been pulsed. This pulsing step requires only a few seconds to accomplish.

When both treatment chambers are properly loaded with resin, the system proceeds to the next step.

TASK 2 STEPS

During this and subsequent steps, valve 1 remains open until loading is complete, as determined by the volume of liquid expelled from valves 3 and 5. Product is routed through valve 5 and into the load pulse chamber, which fills, vent valve 29 being open, until the level reaches a pre-selected point, at which time there is sufficient liquid within the load pulse chamber to re-fluidize the semi-dry resin subsequently to be transferred into it from the regenerated resin treatment chamber above, in a later step. Valve 5 then closes, and product is then removed from the load column by valve 3 until a volume has passed through which will have presented to the resin the optimum amount of sorbable ions for resin loading, at which time valves 1 and 3 close, and, if all other steps are complete, the next cycle can begin.

Similarly, valve 2 opens at the beginning of Task 2, and remains so until regeneration is complete, as determined by the volumes of liquid expelled from valves 4 and 6. Spent regenerate fills the regeneration pulse chamber through valve 6, vent valve 30 being open, until the pre-selected level is reached, providing pulse liquid volume and re-fluidization liquor. Valve 6 then closes, and a pre-selected volume of spent regenerant exits through valve 4, this volume determined by the amount of regeneration required. When this and other steps are complete, a new cycle can begin.

The beginning of Task 2 also includes draining the liquid carried with the resin into the respective treatment chambers during pulse. In the loaded resin treatment chamber, valve 31 is opened to pressurized the vessel, and the liquid and entrained air are expelled from the bottom of the increment of resin in the chamber through valve 13. This liquid is added to the feed liquid. The regenerated resin treatment chamber is likewise drained at this point by pressure through valve 32, the liquid and entrained air exiting through valve 14, where the liquid is routed to the fresh regenerant system.

TASK 3 STEPS

The loaded resin treatment chamber is washed with a diluted feed solution obtained from rinses (Task 5) of earlier cycles, in a "counter-current wash" technique. This wash is injected through valve 21, with vent valve 33 open, and partially fills the freeboard space above the resin.

Likewise, the regenerated resin treatment chamber is washed, countercurrent, with a diluted regenerant solution obtained from earlier cycles. Injection is made through valve 22, with vent valve 34 open.

TASK 4 STEP

The treatment chambers are drained by air pressure entering through valves 31 and 32 and draining of liquid and air through valves 13 and 14. Movement of liquid is thus a "plug flow", affording good rinsing of the resin. The effluent from valve 13 is recycled into the feed, since it now contains approximately the same composition as the feed liquid. The effluent from valve 14 is used in making regenerant, since its composition is basically that of a slightly diluted regenerant.

TASK 5 STEP

The treatment chambers are now rinsed with fresh water entering through valves 25 and 26, with vent valves 33 and 34 open.

TASK 6 STEP

Rinse water is drained from the treatment chambers by air pressure from valves 31 and 32, exiting through valves 13 and 14, the effluents being collected and held for use as the first wash (Task 3) in the next cycle. Tasks 5 and 6 can be repeated as necessary.

TASK 7 STEP

Since the current embodiment of the system includes a two-stage regeneration technique, separating two components (Ca and Mg) from each other, as well as removing them from the feed liquid, this step is used as the first stage of regeneration. First stage regenerant, saturated with calcium sulfate, but containing sufficient acid strength to regenerate the resin and provide a temporarily supersaturated solution, is injected through valve 21 into the loaded resin treatment chamber under air pressure, exiting immediately through valve 13 into a precipitation tank, in which the supersaturated calcium sulfate precipitates. Supernatant liquid from this tank, with a stoichiometric amount of concentrated regenerant added, is re-used as the first stage regenerant.

TASK 8 STEP

The loaded resin treatment chamber, now containing resin from which most calcium has been stripped, is drained by air pressure from valve 31 through valve 13.

TASK 9 STEPS

The semi-dry resin in the treatment chambers is transferred downward into the pulse chambers during this step, after the pulse chambers have been refilled through valves 4 and 6 as mentioned at Task 2.

Valves 11 and 12 are opened, and pumps P23 and P24 pump liquid from the pulse chambers through valves 23 and 24, respectively, into the treatment chambers, where it is forced into the semi-dry resin, washing it downward through valves 11 and 12 into the pulse chambers below. It will be understood that the liquid may be introduced either into the top or bottom of the treatment chambers to promote fluidization and transfer of the resin to the pulse chambers. Resin beads falling into standing liquid, as in the pulse chambers, separate and deaerate, facilitating movement and compaction. Continuation of pump flow moves both liquid and resin downward, packing the resin at the outlet strainer, in good position for later pulsing.

After pumping has been stopped, excess liquid is allowed to drain from the treatment chamber walls into the pulse chambers before valves 11 and 12 close. When this step is complete and the required amounts of feed and regenerant have passed through valves 3 and 4, respectively, the cycle is finished, and sequencing continues with Task 1 of the next cycle.

We claim:

1. An ion exchange apparatus system utilizing moving folded beds for loading and stripping of the ion exchange resin, including at least a resin-containing loading column, a resin-containing stripping column, first resin transfer means for moving increments of liquid-containing loaded resin in a first circuit from the upper portion of the loading column to the lower portion of the stripping column, second resin transfer means for moving increments of liquid-containing stripped resin in a second circuit from the upper portion of the stripping column to the lower portion of the loading column, and liquid inlet and outlet means, respectively, for introducing liquids into upper portions of said columns and removing liquids from the lower portions thereof, wherein the improvement comprises providing separate treatment and pulse chambers in said first and second transfer circuits, including at least one treatment chamber before each of the pulse chambers, the last of the treatment chambers in each circuit receiving liquid-containing resin and being selectively isolatable from the pulse chamber therein and connectable thereto through resin valve means provided therebetween, said last treatment chambers in each of said circuits including gas and liquid inlet and outlet means for use in removing liquid from the resin, said outlet means being arranged to discharge the removed liquid while the last of the treatment chambers in the circuit is isolated from the pulse chamber therein, the pulse chambers receiving the treated resin having means for transfering pulsed compacted increments of treated resin, respectively, to said stripping and loading columns, said loading and stripping columns being full of resin from the bottom to the top thereof, and said first and second resin transfer means being arranged so that the introduction of each pulsed compacted resin increment to the bottom of the loading or stripping column causes the explusion of a resin increment of corresponding compacted volume from the top thereof for transfer, respectively, in said first and second circuits.

2. The apparatus system of claim 1 in which said pulse chambers have a resin inlet at the top and a resin outlet at the bottom thereof, and in which the pulse chambers are provided with a separate liquid outlet in the lower portion thereof connected to the inlet of pump means supplying liquid to the upper portion of the pulse chamber above the resin increment therein, the arrangement being such that liquid can be circulated downwardly through the resin increments held in the pulse chambers to provide compacted increments for transfer to the stripping or loading columns.

3. The apparatus of claim 2 in which means are provided for introducing and holding pools of liquid in said first and second circuit pulse chambers so that the resin increments transferred from the last of the treatment chambers drop into a liquid pool in their respective pulse chamber.

4. The appparatus of claim 3 in which said means for introducing liquid into said pools includes means for supplying liquid thereto from the bottom of the respective stripping or loading column to which the resin increment is to be pulsed.

5. The apparatus of claim 1 in which means are provided for introducing and holding pools of liquid in said first and second circuit pulse chambers so that the resin increments transferred from the last of the treatment chambers drop into a liquid pool in their respective pulse chamber.

6. The apparatus of claim 5 in which said means for introducing liquid into said pools includes means for supplying liquid thereto from the bottom of the respective stripping or loading column to which the resin increment is to be pulsed.

7. The method of operating components of an ion exchange resin system for removing ions for aqueous solutions, which system utilizes moving folded beds for loading and stripping of the resin, said system including at least a resin-containing loading column, a resin-containing stripping column, said loading and stripping columns being maintained full of resin so that compacted increments of resin can be transferred to and from these columns, first and second resin transfer circuits for transferring resin respectively from the upper portion of the loading column to the lower portion of the stripping column and from the upper portion of the stripping column to the lower portion of the loading column, each of said circuits including at least one resin treatment chamber followed by a separate pulse chamber, the last resin treatment chamber in each circuit before the pulse chamber being selectively isolatable from the pulse chamber and having both gas and liquid inlet and outlet means, comprising the steps of transferring increments of resin to the last of the treatment chambers in said circuits, passing air through the resin increment therein to reduce said resin increment to a semi-dry condition, providing a pool of liquid in the pulse chamber connected thereto, and subsequently discharging the air-containing resin increment from the last treatment chamber by dropping it into the pool of liquid within the pulse chamber to promote deaeration of the resin increment.

8. The method of claim 7 in which said pool of liquid in the pulse chamber of the first circuit is an aqueous solution like the solution in the bottom portion of the stripping column, and the pool of liquid in the pulse chamber of the second circuit is an aqueous solution like the solution in the bottom portion of the loading column.

9. The method of claim 8 in which, prior to dropping of the resin increments into said pulse chambers, the resin increments in the last treatment chambers of the first and second circuits are rewet with liquid like that of the pool of the pulse chamber connected thereto.

10. The method of claim 8 in which, prior to transfer of the resin increments from the pulse chambers respectively to the stripping and loading columns, the resin increments in the pulse chambers are compacted by pumping liquid downwardly therethrough, the liquid used to compact the increments being the same as the liquid in the respective pool.

11. The method of claim 7 in which, prior to transfer of the resin increments from the pulse chambers respectively to the stripping and loading columns, the resin increments in the pulse chambers are compacted by pumping liquid downwardly therethrough, the liquid used to compact the increments being the same as the liquid in the respective pool.

* * * * *